(12) United States Patent
Liu

(10) Patent No.: US 8,811,631 B2
(45) Date of Patent: Aug. 19, 2014

(54) THERMOACOUSTIC DEVICE

(75) Inventor: Liang Liu, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 179 days.

(21) Appl. No.: 12/757,159

(22) Filed: Apr. 9, 2010

(65) Prior Publication Data

US 2011/0114413 A1    May 19, 2011

(30) Foreign Application Priority Data

Nov. 16, 2009    (CN) .......................... 2009 1 0222361

(51) Int. Cl.
*H04R 25/00* (2006.01)
*H04R 23/00* (2006.01)
*B82Y 30/00* (2011.01)
*B82Y 35/00* (2011.01)

(52) U.S. Cl.
CPC ........ *H04R 23/002* (2013.01); *H04R 2205/021* (2013.01); *B82Y 30/00* (2013.01); *B82Y 35/00* (2013.01)
USPC ........................................................ 381/164

(58) Field of Classification Search
CPC ........... H04R 23/002; H04R 2205/021; B82Y 30/00; B82Y 35/00
USPC ........................................................ 381/164
See application file for complete search history.

(56) References Cited

U.S. PATENT DOCUMENTS

| | | | |
|---|---|---|---|
| 1,528,774 A | 3/1925 | Kranz | |
| 3,670,299 A | 6/1972 | Kahn | |
| 3,982,143 A | 9/1976 | Tamura et al. | |
| 4,002,897 A | 1/1977 | Kleinman et al. | |
| 4,045,695 A | 8/1977 | Itagaki et al. | |
| 4,334,321 A | 6/1982 | Edelman | |
| 4,503,564 A | 3/1985 | Edelman et al. | |
| 4,641,377 A | 2/1987 | Rush et al. | |
| 4,689,827 A | 8/1987 | Gurney, Jr. | |
| 4,766,607 A | 8/1988 | Feldman | |
| 5,694,477 A | 12/1997 | Kole | |
| 6,307,300 B1 | 10/2001 | Yamamoto et al. | |
| 6,473,625 B1 | 10/2002 | Williams et al. | |
| 6,777,637 B2 | 8/2004 | Nakayama et al. | |

(Continued)

FOREIGN PATENT DOCUMENTS

| CN | 2083373 | 8/1991 |
|---|---|---|
| CN | 2251746 Y | 4/1997 |

(Continued)

OTHER PUBLICATIONS

Silvanus P. Thompson, The Photophone, Nature, Sep. 23, 1880, vol. XXII, No. 569, pp. 481.

(Continued)

*Primary Examiner* — Jianchun Qin
(74) *Attorney, Agent, or Firm* — Novak Druce Connolly Bove + Quigg LLP

(57) ABSTRACT

A thermoacoustic device includes an electrode layer and a sound wave generator. The sound wave generator is disposed on a surface of the sound wave generator. The electrode layer includes a plurality of insulated wires and a plurality of conductive wires. The conductive wires are disposed apart from each other and crossed with the insulated wires. The sound wave generator is electrically connected with conductive wires.

9 Claims, 6 Drawing Sheets

(56) References Cited

U.S. PATENT DOCUMENTS

| | | | |
|---|---|---|---|
| 6,803,116 B2 | 10/2004 | Ikeda | |
| 6,803,840 B2 | 10/2004 | Hunt et al. | |
| 6,808,746 B1 | 10/2004 | Dai et al. | |
| 6,864,668 B1 | 3/2005 | McCune et al. | |
| 6,921,575 B2 | 7/2005 | Horiuchi et al. | |
| 7,045,108 B2 | 5/2006 | Jiang et al. | |
| 7,130,436 B1 | 10/2006 | Tabata et al. | |
| 7,144,830 B2 * | 12/2006 | Hill et al. | 442/205 |
| 7,242,250 B2 | 7/2007 | Tsurumi | |
| 7,315,204 B2 | 1/2008 | Seven | |
| 7,366,318 B2 | 4/2008 | Nevill | |
| 7,393,428 B2 | 7/2008 | Huang et al. | |
| 7,474,590 B2 | 1/2009 | Watabe et al. | |
| 7,572,165 B2 | 8/2009 | Liu et al. | |
| 7,723,684 B1 | 5/2010 | Haddon et al. | |
| 7,799,163 B1 | 9/2010 | Mau et al. | |
| 8,249,280 B2 * | 8/2012 | Liu | 381/164 |
| 2001/0005272 A1 | 6/2001 | Buchholz | |
| 2001/0048256 A1 | 12/2001 | Miyazaki et al. | |
| 2002/0076070 A1 | 6/2002 | Yoshikawa et al. | |
| 2003/0038925 A1 | 2/2003 | Choi | |
| 2003/0152238 A1 | 8/2003 | Daly | |
| 2003/0165249 A1 | 9/2003 | Higuchi | |
| 2004/0053780 A1 | 3/2004 | Jiang et al. | |
| 2004/0070326 A1 | 4/2004 | Mao et al. | |
| 2004/0119062 A1 | 6/2004 | Lu et al. | |
| 2005/0006801 A1 | 1/2005 | Kinloch et al. | |
| 2005/0036905 A1 | 2/2005 | Gokturk | |
| 2005/0040371 A1 | 2/2005 | Watanabe et al. | |
| 2005/0129939 A1 | 6/2005 | Shigematsu et al. | |
| 2005/0201575 A1 | 9/2005 | Koshida et al. | |
| 2006/0072770 A1 | 4/2006 | Miyazaki | |
| 2006/0104451 A1 | 5/2006 | Browning et al. | |
| 2006/0147081 A1 | 7/2006 | Mango, III et al. | |
| 2006/0264717 A1 | 11/2006 | Pesach et al. | |
| 2007/0145335 A1 | 6/2007 | Anazawa | |
| 2007/0161263 A1 | 7/2007 | Meisner | |
| 2007/0164632 A1 | 7/2007 | Adachi et al. | |
| 2007/0166223 A1 | 7/2007 | Jiang et al. | |
| 2007/0176498 A1 | 8/2007 | Sugiura et al. | |
| 2008/0063860 A1 | 3/2008 | Song et al. | |
| 2008/0095694 A1 * | 4/2008 | Nakayama et al. | 423/445 B |
| 2008/0170982 A1 | 7/2008 | Zhang et al. | |
| 2008/0248235 A1 | 10/2008 | Feng et al. | |
| 2008/0260188 A1 | 10/2008 | Kim | |
| 2008/0299031 A1 | 12/2008 | Liu et al. | |
| 2008/0304201 A1 | 12/2008 | Takao et al. | |
| 2009/0016951 A1 | 1/2009 | Kawabata et al. | |
| 2009/0028002 A1 | 1/2009 | Sugiura et al. | |
| 2009/0045005 A1 | 2/2009 | Byon et al. | |
| 2009/0085461 A1 | 4/2009 | Feng et al. | |
| 2009/0096346 A1 | 4/2009 | Liu et al. | |
| 2009/0096348 A1 | 4/2009 | Liu et al. | |
| 2009/0145686 A1 | 6/2009 | Watabe et al. | |
| 2009/0153012 A1 | 6/2009 | Liu et al. | |
| 2009/0167136 A1 | 7/2009 | Liu et al. | |
| 2009/0167137 A1 | 7/2009 | Liu et al. | |
| 2009/0196981 A1 | 8/2009 | Liu et al. | |
| 2009/0232336 A1 | 9/2009 | Pahl | |
| 2009/0268557 A1 | 10/2009 | Jiang et al. | |
| 2009/0268562 A1 | 10/2009 | Jiang et al. | |
| 2009/0268563 A1 | 10/2009 | Jiang et al. | |
| 2010/0054502 A1 | 3/2010 | Miyachi | |
| 2010/0054507 A1 | 3/2010 | Oh et al. | |
| 2010/0086166 A1 * | 4/2010 | Jiang et al. | 381/380 |
| 2010/0166232 A1 | 7/2010 | Liu et al. | |
| 2010/0233472 A1 | 9/2010 | Liu et al. | |
| 2011/0171419 A1 | 7/2011 | Li et al. | |

FOREIGN PATENT DOCUMENTS

| | | |
|---|---|---|
| CN | 2282750 Y | 5/1998 |
| CN | 2302622 | 12/1998 |
| CN | 2327142 | 6/1999 |
| CN | 1239394 | 12/1999 |
| CN | 1265000 | 8/2000 |
| CN | 2425468 | 3/2001 |
| CN | 2485699 Y | 4/2002 |
| CN | 1407392 | 4/2003 |
| CN | 1443021 | 9/2003 |
| CN | 1629627 | 6/2005 |
| CN | 1691246 | 11/2005 |
| CN | 1698400 | 11/2005 |
| CN | 1698400 A | 11/2005 |
| CN | 1711620 A | 12/2005 |
| CN | 2779422 Y | 5/2006 |
| CN | 1787696 | 6/2006 |
| CN | 2787870 | 6/2006 |
| CN | 2798479 | 7/2006 |
| CN | 1821048 | 8/2006 |
| CN | 1886820 | 12/2006 |
| CN | 1944829 | 4/2007 |
| CN | 1982209 | 6/2007 |
| CN | 1997243 | 7/2007 |
| CN | 101239712 | 8/2008 |
| CN | 101284662 | 10/2008 |
| CN | 201150134 | 11/2008 |
| CN | 101314464 | 12/2008 |
| CN | 101437663 | 5/2009 |
| CN | 101458221 A | 6/2009 |
| CN | 101471213 | 7/2009 |
| CN | 101715155 | 5/2010 |
| CN | 101400198 | 9/2010 |
| DE | 102005059270 | 6/2007 |
| JP | 49-24593 | 3/1974 |
| JP | 58-9822 | 1/1983 |
| JP | 58-19491 | 2/1983 |
| JP | 60-22900 | 2/1985 |
| JP | 61-294786 | 12/1986 |
| JP | 1-255398 | 10/1989 |
| JP | 3-147497 | 6/1991 |
| JP | 4-126489 | 4/1992 |
| JP | 6-33390 | 4/1994 |
| JP | 7-282961 | 10/1995 |
| JP | 8-20868 | 1/1996 |
| JP | 9-105788 | 4/1997 |
| JP | 11-282473 | 10/1999 |
| JP | 11-300274 | 11/1999 |
| JP | 2001333493 | 11/2001 |
| JP | 2002-186097 | 6/2002 |
| JP | 2002-352940 | 12/2002 |
| JP | 2002346996 | 12/2002 |
| JP | 2002542136 | 12/2002 |
| JP | 2003500325 | 1/2003 |
| JP | 2003-154312 | 5/2003 |
| JP | 2003198281 | 7/2003 |
| JP | 2003-266399 | 9/2003 |
| JP | 2003-319490 | 11/2003 |
| JP | 2003-319491 | 11/2003 |
| JP | 2003-332266 | 11/2003 |
| JP | 2003-343867 | 12/2003 |
| JP | 20042103 | 1/2004 |
| JP | 2004-107196 | 4/2004 |
| JP | 2004229250 | 8/2004 |
| JP | 2005-20315 | 1/2005 |
| JP | 2005-51284 | 2/2005 |
| JP | 2005-73197 | 3/2005 |
| JP | 2005-97046 | 4/2005 |
| JP | 2005189322 | 7/2005 |
| JP | 2005-235672 | 9/2005 |
| JP | 2005-318040 | 11/2005 |
| JP | 2005-534515 | 11/2005 |
| JP | 2005-341554 | 12/2005 |
| JP | 2005333601 | 12/2005 |
| JP | 2006-93932 | 4/2006 |
| JP | 2006-180082 | 7/2006 |
| JP | 2006-202770 | 8/2006 |
| JP | 2006-217059 | 8/2006 |
| JP | 2006270041 | 10/2006 |
| JP | 2007-24688 | 2/2007 |
| JP | 2007-54831 | 3/2007 |
| JP | 2007-167118 | 7/2007 |
| JP | 2007-174220 | 7/2007 |

(56) References Cited

FOREIGN PATENT DOCUMENTS

| | | |
|---|---|---|
| JP | 2007-187976 | 7/2007 |
| JP | 2007-196195 | 8/2007 |
| JP | 2007-228299 | 9/2007 |
| JP | 2007-527099 | 9/2007 |
| JP | 2008-62644 | 3/2008 |
| JP | 2008-101910 | 5/2008 |
| JP | 2008-153042 | 7/2008 |
| JP | 2008-163535 | 7/2008 |
| JP | 2008-269914 | 11/2008 |
| JP | 2009-31031 | 2/2009 |
| JP | 2009-91239 | 4/2009 |
| JP | 2009-94074 | 4/2009 |
| JP | 200994074 | 4/2009 |
| JP | 2009-146896 | 7/2009 |
| JP | 2009-146898 | 7/2009 |
| JP | 2009-164125 | 7/2009 |
| JP | 2009-184907 | 8/2009 |
| JP | 2009-184908 | 8/2009 |
| KR | 10-0761548 | 9/2007 |
| TW | 432780 | 5/2001 |
| TW | 568882 | 1/2004 |
| TW | 200603400 | 1/2006 |
| TW | I248253 | 1/2006 |
| TW | 200726290 | 7/2007 |
| TW | 200740976 | 11/2007 |
| TW | 200744399 | 12/2007 |
| TW | 200726300 | 2/2008 |
| TW | 200829675 | 7/2008 |
| TW | 200833862 | 8/2008 |
| TW | 200950569 | 12/2009 |
| TW | 201029481 | 8/2010 |
| WO | WO0073204 | 12/2000 |
| WO | WO2004012932 | 2/2004 |
| WO | WO2005102924 | 11/2005 |
| WO | WO2005120130 | 12/2005 |
| WO | WO2007043837 | 4/2007 |
| WO | WO2007049496 | 5/2007 |
| WO | WO2007052928 | 5/2007 |
| WO | WO2007099975 | 9/2007 |
| WO | WO2007111107 | 10/2007 |
| WO | WO2008/029451 | 3/2008 |

OTHER PUBLICATIONS

Lee et al., Photosensitization of nonlinear scattering and photoacoustic emission from single-walled carbon nanotubes, Applied Physics Letters, Mar. 13, 2008, 92, 103122.

Alexander Graham Bell, Selenium and the Photophone, Nature, Sep. 23, 1880, pp. 500-503.

Chen, Huxiong; Diebold, Gerald, "Chemical Generation of Acoustic Waves: A Giant Photoacoustic Effect", Nov. 10, 1995, Science, vol. 270, pp. 963-966.

Amos, S.W.; "Principles of Transistor Circuits"; 2000; Newnes-Butterworth-Heinemann; 9th ed.;p. 114.

P.M. Ajayan et al., "Nanotubes in a flash-Ignition and reconstruction", Science, vol. 296, pp. 705, Apr. 26, 2002.

F.Kontomichos et al., "A thermoacoustic device for sound reproduction", acoustics 08 Paris, pp. 4349-4353, Jun. 29-Jul. 4, 2008.

F. Kontomichos et al ., "A thermoacoustic device for sound reproduction", acoustics 08' Paris, Jun. 29-Jul. 4, 2008.

Kaili Jiang, Qunqing Li, Shoushan Fan, Spinning continuous carbon nanotube yarns, Nature, Oct. 24, 2002, pp. 801, vol. 419.

Swift Gregory W., Thermoacoustic Engines and Refrigerators, Physics Today, Jul. 1995, pp. 22-28, vol. 48.

Kai Liu, Yinghui Sun, Lei Chen, Chen Feng, Xiaofeng Feng, Kaili Jiang et al., Controlled Growth of Super-Aligned Carbon Nanotube Arrays for Spinning Continuous Unidirectional Sheets with Tunable Physical Properties, Nano Letters, 2008, pp. 700-705, vol. 8, No. 2.

Yang Wei, Kaili Jiang, Xiaofeng Feng, Peng Liu et al., Comparative studies of multiwalled carbon nanotube sheets before and after shrinking, Physical Review B, Jul. 25, 2007, vol. 76, 045423.

Lina Zhang, Chen Feng, Zhuo Chen, Liang Liu et al., Superaligned Carbon Nanotube Grid for High Resolution Transmission Electron Microscopy of Nanomaterials, Nano Letters, 2008, pp. 2564-2569, vol. 8, No. 8.

W. Yi, L.Lu, Zhang Dianlin et al., Linear Specific Heat of Carbon Nanotubes, Physical Review B, Apr. 1, 1999, vol. 59, No. 14, R9015-9018.

Zhuangchun Wu, Zhihong Chen, Xu Du et al.,Transparent, Conductive Carbon Nanotube Films, Science, Aug. 27, 2004, pp. 1273-1276, vol. 305.

Edward C. Wente, The Thermophone, Physical Review, 1922, pp. 333-345,vol. 19.

J.J.Hopfield, Spectra of Hydrogen, Nitrogen and Oxygen in the Extreme Ultraviolet, Physical Review, 1922, pp. 573-588,vol. 20.

Strutt John William, Rayleigh Baron, The Theory of Sound, 1926, pp. 226-235, vol. 2.

Lin Xiao, Zhuo Chen, Chen Feng, Liang Liu et al., Flexible, Stretchable, Transparent Carbon Nanotube Thin Film Loudspeakers, Nano Letters, 2008, pp. 4539-4545, vol. 8, No. 12, US.

William Henry Preece, On Some Thermal Effects of Electric Currents, Proceedings of the Royal Society of London, 1879-1880, pp. 408-411, vol. 30.

H.D. Arnold, I.B. Crandall, The Thermophone as a Precision Source of Sound, Physical Review, 1917, pp. 22-38, vol. 10.

P. De Lange, On Thermophones, Proceedings of the Royal Society of London. Series A, Apr. 1, 1915, pp. 239-241, vol. 91, No. 628.

Braun Ferdinand, Notiz uber Thermophonie, Ann. Der Physik, Apr. 1898, pp. 358-360,vol. 65.

Frank P. Incropera, David P. Dewitt et al., Fundamentals of Heat and Mass Transfer, 6th ed., 2007, pp. A-5, Wiley:Asia.

Mei Zhang, Shaoli Fang, Anvar A. Zakhidov, Sergey B. Lee et al., Strong, Transparent, Multifunctional, Carbon Nanotube Sheets, Science, Aug. 19, 2005, pp. 1215-1219, vol. 309.

Xiaobo Zhang, Kaili Jiang, Chen Feng, Peng Liu et al., Spinning and Processing Continuous Yarns from 4-Inch Wafer Scale Super-Aligned Carbon Nanotube Arrays, Advanced Materials, 2006, pp. 1505-1510, vol. 18.

Lin Xiao et al., "Flexible, stretchable, transparent carbon nanotube thin film loudspeakers" vol. 8, No. 12, pp. 4539-4545 ,2008.

* cited by examiner

THERMOACOUSTIC DEVICE

This application claims all benefits accruing under 35 U.S.C. §119 from China Patent Application No. 200910222361.X, filed on Nov. 16, 2009 in the China Intellectual Property Office.

BACKGROUND

1. Technical Field

The present disclosure relates to acoustic devices and, particularly, to a carbon nanotube based thermoacoustic device.

2. Description of Related Art

Acoustic devices generally include a signal device and a sound wave generator electrically connected to the signal device. The signal device inputs signals to the sound wave generator, such as loudspeakers. A loudspeaker is an electro-acoustic transducer that converts electrical signals into sound.

There are different types of loudspeakers, categorized according to their working principle, such as electro-dynamic loudspeakers, electromagnetic loudspeakers, electrostatic loudspeakers, and piezoelectric loudspeakers. These various types of loudspeakers use mechanical vibration to produce sound waves. In other words, they all achieve "electro-mechanical-acoustic" conversion. Among these various types, the electro-dynamic loudspeakers are the most widely used.

A thermophone based on the thermoacoustic effect was made by H. D. Arnold and I. B. Crandall (H. D. Arnold and I. B. Crandall, "The thermophone as a precision source of sound," Phys. Rev. 10, pp 22-38 (1917)). A platinum strip with a thickness of $7 \times 10^{-5}$ cm and a heat capacity per unit area of $2 \times 10^{-4}$ J/cm$^2$*K was used as a thermoacoustic element. However, the thermophone adopting the platinum strip produced weak sounds because the heat capacity per unit area of the platinum strip was too high.

What is needed, therefore, is to provide a thermoacoustic device having good sound effect and high efficiency.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
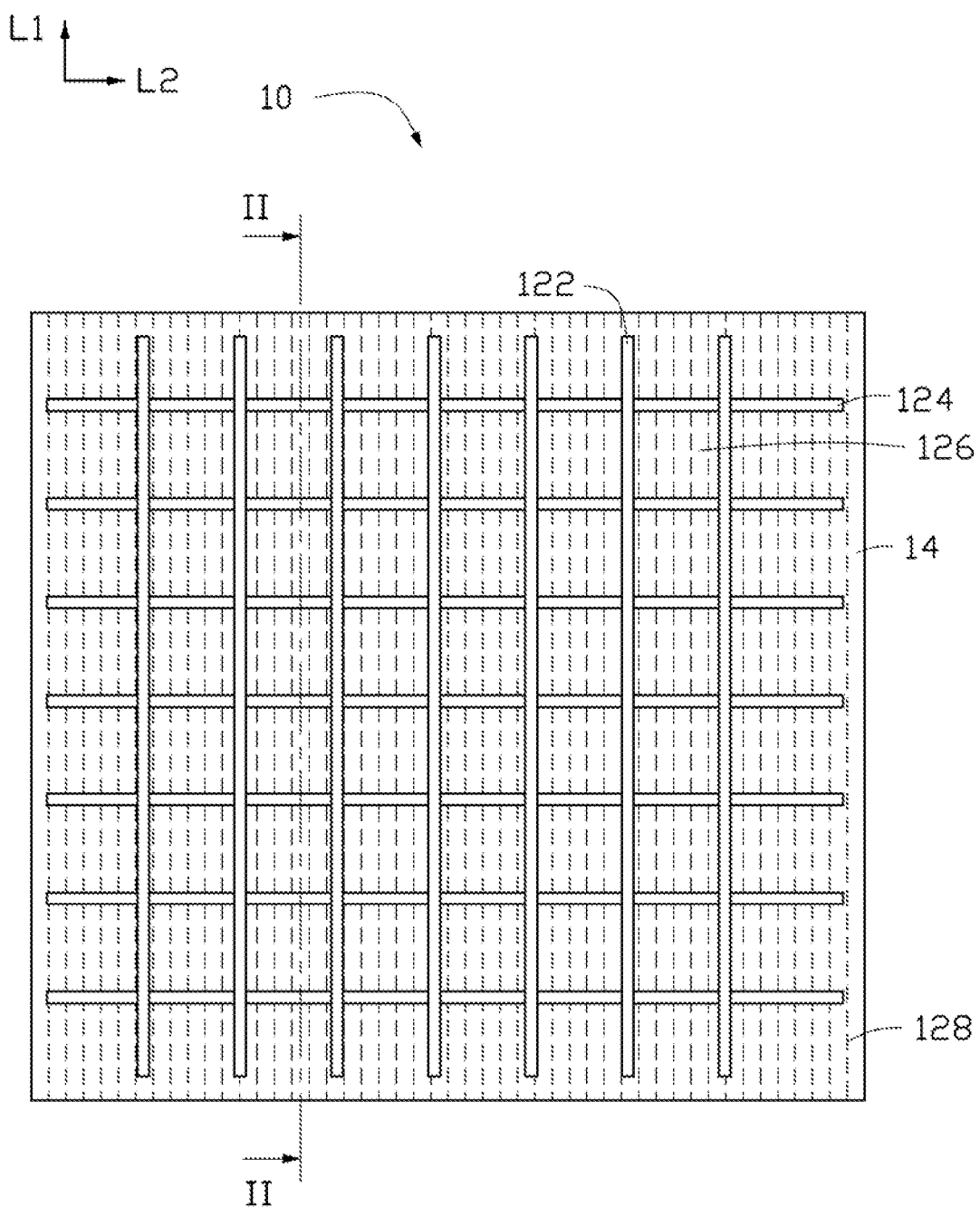
FIG. 1 is a schematic top plan view of one embodiment of a thermoacoustic device.
Figure 2:
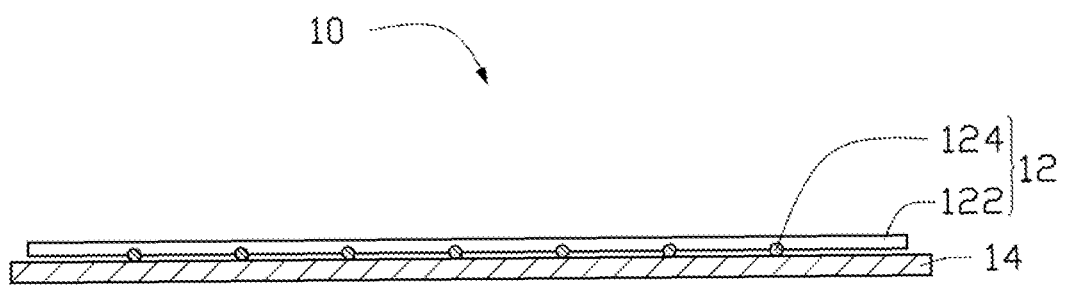
FIG. 2 is a cross-sectional view taken along a line II-II of the thermoacoustic module in FIG. 1.

Referring to FIG. 1 and FIG. 2, one embodiment of a thermoacoustic device 10 includes an electrode layer 12 and a sound wave generator 14. The sound wave generator 14 is disposed on a surface of the electrode layer 12.

The electrode layer 12 can be used to provide electrodes for the sound wave generator 14 and support the sound wave generator 14. The electrode layer 12 includes a plurality of insulated wires 122 and a plurality of conductive wires 124. The plurality of conductive wires 124 electrically connects with the sound wave generator 14. The plurality of insulated wires 122 and the plurality of conductive wires 124 cross with each other to form a net-structured electrode layer 12. The plurality of insulated wires 122 are oriented along a direction of L1 and disposed apart from each other. The plurality of conductive wires 124 are oriented along a direction of L2 and disposed apart from each other. An angle α defined between the direction L1 and the direction L2 is in a range from about 0 degrees to about 90 degrees. In one embodiment, according to FIGS. 1 and 2, the direction L1 is substantially perpendicular with the direction L2, e.g. α is about 90 degrees. The insulated wires 122 are disposed on the same side of the conductive wires 124. In the intersections between the insulated wires 122 and the conductive wires 124, the insulated wires 122 and the conductive wires 124 are fixed by adhesive or jointing method. If the insulated wires 122 have a low melting point, the insulated wires 122 and the conductive wires 124 can join with each other by a heat-pressing method. A plurality of meshes 126 are defined by the insulated wires 122 and the conductive wires 124. The sound wave generator 14 includes a plurality of carbon nanotubes orderly aligned along the direction L1.

Diameters of the insulated wires 122 can be in a range from about 10 microns to about 5 millimeters. The insulated wires 122 are made of insulated materials, such as fiber, plastic, resin, and silica gel. The fiber includes plant fiber, animal fiber, wood fiber, and mineral fiber. The insulated wires 122 can be cotton wires, twine, wool, or nylon wires. Particularly, the insulated material can be flexible and refractory. Further, the insulated wires 122 can be made of conductive materials coated with insulated materials. In one embodiment according to FIG. 1, the insulated wires 122 are made of nylon, and a diameter of each insulated wire 122 is about 0.5 millimeters. The plurality of insulated wires 122 can be disposed apart from each other or contacting with each other. If the plurality of insulated wires 122 is located apart from each other, a distance between every two adjacent insulated wires 122 can be in a range from 10 microns to about 10 centimeters. The distance between every two adjacent insulated wires 122 can be uniform. In one embodiment, the distance between every two adjacent insulated wires 122 is about 2 centimeters.

Diameters of the conductive wires 124 can range from about 10 microns to about 5 millimeters. A material of the conductive wires 124 can be metals, conductive adhesives, carbon nanotubes, and indium tin oxides among other materials. The conductive wires 124 can be made of insulated wire structures coated by conductive materials. In one embodiment, the conductive wires 124 are copper threads. The plurality of conductive wires 124 are located apart from each other and a distance between every two adjacent conductive wires 124 can be substantially uniform. A distance between every two adjacent conductive wires 124 is in a range from about 10 microns to about 10 centimeters. In one embodiment, the distance between every two adjacent conductive wires 124 is about 2 centimeters.

The sound wave generator 14 is suspended on the electrode layer 12 by provision of the meshes 126. The sound wave generator 14 has a large contacting area with the ambient air. The meshes 126 are all quadrangles. According to the angle α defined by the directions L1 and L2, the meshes 126 can be square, rectangular, or rhombus. The size of the meshes 126 is determined by the distance between adjacent insulated wires 122 and the distance between adjacent conductive wires 124. In one embodiment, the angle α is 90 degrees and the distance between the insulated wires 122 is equal to the distance between the conductive wires 124, forming square meshes 126.

A conductive adhesive layer (not shown) can be further provided between the sound wave generator 14 and the electrode layer 12. The conductive adhesive layer can be located on a contacting surface of the sound wave generator 14. The contacting surface of the sound wave generator 14 contacts the electrode layer 12. The conductive adhesive layer can provide a stronger bond between the sound wave generator 14 and the electrode layer 12, if needed. In one embodiment, the conductive adhesive layer is a layer of silver paste.

The sound wave generator 14 has a planar structure and includes a carbon nanotube structure or a carbon nanotube composite structure. The carbon nanotube structure is a pure structure consisting of carbon nanotubes. The carbon nanotube composite structure is a composite of carbon nanotubes and other materials.

The carbon nanotube structure has a large specific surface area. In one embodiment, the heat capacity per unit area of the carbon nanotube structure can be less than or equal to about $2 \times 10^{-4}$ J/cm$^2$*K. In one embodiment, the heat capacity per unit area of the carbon nanotube structure is less than or equal to about $1.7 \times 10^{-6}$ J/cm$^2$*K. The carbon nanotube structure can include a plurality of carbon nanotubes uniformly distributed therein, and the carbon nanotubes therein can be joined by Van der Waals attractive force therebetween. It is noteworthy, that the carbon nanotube structure must include metallic carbon nanotubes. The carbon nanotubes in the carbon nanotube structure can be orderly or disorderly arranged. The term 'disordered carbon nanotube structure' means a structure where the carbon nanotubes are arranged along many different directions, and/or entangled with each other. 'Ordered carbon nanotube structure' means a structure where the carbon nanotubes are arranged in a consistently systematic manner, e.g., the carbon nanotubes are arranged approximately along a same direction and or have two or more sections within each of which the carbon nanotubes arrange approximately along a same direction (different sections can have different directions). The carbon nanotubes in the carbon nanotube structure can be single-walled, double-walled, and/or multi-walled carbon nanotubes. It is also noteworthy, that there may be many layers of ordered and/or disordered carbon nanotube films in the carbon nanotube structure.

The carbon nanotube composite structure includes a matrix and one or more carbon nanotube structures. The matrix encloses the entire carbon nanotube structure therein. Alternatively, the carbon nanotube structure includes a plurality of pores dispersed or permeated by the matrix. Sizes of the pores can be less than 10 microns. The matrix can be made from polymer, inorganic non-metallic or combinations thereof, or any other material, so long as the matrix has good thermal stability and is not easily distorted, melted, or decomposed under the working temperature of the thermoacoustic device.

The carbon nanotube structure can include at least one carbon nanotube film, at least one carbon nanotube wire structure, or combinations thereof. The carbon nanotube structure has a substantially planar structure. The smaller the mass per unit area of the carbon nanotube structure, the smaller the heat capacity per unit area. The smaller the heat capacity per unit area, the faster the temperature ramp rate of the carbon nanotube structure when applied an audio frequency electric current. The faster the temperature ramp rate, the higher the sound pressure level can the thermoacoustic device 10 produce.

In one embodiment, the carbon nanotube film can be a drawn carbon nanotube film drawn from a carbon nanotube array. The drawn carbon nanotube film includes a plurality of successive and oriented carbon nanotubes segments joined end-to-end by Van der Waals attractive force therebetween. Each of the carbon nanotube segments includes a plurality of carbon nanotubes disposed side by side. The axis of each carbon nanotube in the drawn carbon nanotube film can be substantially oriented in a single direction. In one embodiment, an axis direction of the carbon nanotubes is substantially perpendicular to an axis direction of the conductive wires 124.

The carbon nanotube structure of the sound wave generator 14 can also include at least two stacked carbon nanotube films. In other embodiments, the carbon nanotube structure can include two or more coplanar carbon nanotube films. These coplanar carbon nanotube films can also be stacked upon other films. The number of the layers of the carbon nanotube films is not limited. Stacking the carbon nanotube films will add to the structural integrity of the carbon nanotube structure. In some embodiments, the carbon nanotube structure has a free standing structure. The term "free standing" means a structure that can keep its shape with two structural supports. However, a large enough specific surface area must be maintained to achieve the thermoacoustic effect.

In one embodiment, the carbon nanotube structure includes four layers of drawn carbon nanotube films stacked upon each other, and axis directions of the carbon nanotubes in every two contacting carbon nanotubes are substantially perpendicular. A width and a length of the carbon nanotube film are both about 3 centimeters. The carbon nanotube structures having four drawn carbon nanotube films have good light transparency and structural integrity.

In other embodiments, the carbon nanotube structure includes one or more carbon nanotube wire structures. The carbon nanotube wire structure includes at least one carbon nanotube wire. A heat capacity per unit area of the carbon nanotube wire structure can be less than $2 \times 10^{-4}$ J/cm$^2$*K. In one embodiment, the heat capacity per unit area of the carbon nanotube wire-like structure is less than $5 \times 10^{-5}$ J/cm$^2$*K. The carbon nanotube wire can be twisted or untwisted. The carbon nanotube wire structure can comprise of twisted carbon nanotube wires, untwisted carbon nanotube wires, or combinations thereof. The carbon nanotube wire structure comprises of two or more carbon nanotube wires, twisted or untwisted, that are twisted or bundled together. The carbon nanotube wires in the carbon nanotube wire structure can be substantially parallel to each other to form a bundle-like structure or twisted with each other to form a twisted structure.

The untwisted carbon nanotube wire can be formed by treating the drawn carbon nanotube film with an organic solvent. Specifically, the drawn carbon nanotube film is treated by applying the organic solvent to the drawn carbon nanotube film to soak the entire surface of the drawn carbon nanotube film. After being soaked by the organic solvent, the adjacent paralleled carbon nanotubes in the drawn carbon nanotube film will bundle together, due to the surface tension of the organic solvent as the organic solvent volatilizes, and thus, the drawn carbon nanotube film will shrink into untwisted carbon nanotube wire. The organic solvent is volatile. The untwisted carbon nanotube wire includes a plurality of carbon nanotubes substantially oriented along a same direction (e.g., a direction along the length of the untwisted carbon nanotube wire). The carbon nanotubes are substantially parallel to the axis of the untwisted carbon nanotube wire. The length of the untwisted carbon nanotube wire can be set as desired. The diameter of an untwisted carbon nanotube wire can range from about 0.5 nanometers to about 100 micrometers. In one embodiment, the diameter of the untwisted carbon nanotube wire is about 50 micrometers.

The twisted carbon nanotube wire can be formed by twisting a drawn carbon nanotube film by mechanical force to turn the two ends of the drawn carbon nanotube film in opposite directions. The twisted carbon nanotube wire includes a plurality of carbon nanotubes oriented around an axial direction of the twisted carbon nanotube wire. The carbon nanotubes align around the axis of the carbon nanotube twisted wire like a helix. The length of the carbon nanotube wire can be set as desired. The diameter of the twisted carbon nanotube wire can range from about 0.5 nanometers to about 100 micrometers. Furthermore, the twisted carbon nanotube wire can be treated with a volatile organic solvent, before or after being twisted. After being soaked by the organic solvent, the adjacent paralleled carbon nanotubes in the twisted carbon nanotube wire will bundle together, due to the surface tension of the organic solvent as the organic solvent volatilizes. The specific surface area of the twisted carbon nanotube wire will decrease. The density and strength of the twisted carbon nanotube wire will increase. It is noteworthy, that the twisted and untwisted carbon nanotube wire structure can be produced by methods that are similar to the methods of making twisted and untwisted carbon nanotube wires.

The carbon nanotube structure can include a plurality of carbon nanotube wire structures. The plurality of carbon nanotube wire structures can be parallel with each other, crossed with each other, weaved together, or twisted with each other to form a planar structure. The resulting structure can be planar if so desired. In one embodiment, a carbon nanotube textile can be formed by the carbon nanotube wire structures and used as the carbon nanotube structure. The carbon nanotube structure can include one carbon nanotube wire structure, and the carbon nanotube structure can circle or twist to form a planar structure.

The carbon nanotube structure comprises a plurality of carbon nanotubes and has a small heat capacity per unit area. The carbon nanotube structure can have a large area to cause pressure oscillations in the surrounding medium by temperature waves generated by the sound wave generator 14. In use, when signals, such as electrical signals, with variations in the application of the signal and/or strength are applied to the carbon nanotube structure of the sound wave generator 14, heat is produced in the carbon nanotube structure according to the variations of the signal and/or signal strength. Temperature waves, which propagate into the surrounding medium, are obtained. The temperature waves produce pressure waves in the surrounding medium, resulting in sound generation. In this process, it is the thermal expansion and contraction of the medium in the vicinity of the sound wave generator 14 that produces sound. This is distinct from the mechanism of the conventional loudspeaker, in which the mechanical movement of the diaphragm creates the pressure waves. If the input signals are electrical signals, the operating principle of the thermoacoustic device 10 is an "electrical-thermal-sound" conversion. If the input signals are optical signals, the operation principle of the thermoacoustic device 10 is an "optical-thermal-sound" conversion. The sound wave generator 14 can absorb energy of the optical signals and the resulting energy will then radiate as heat. This heat causes detectable sound signals due to pressure variation in the surrounding (environmental) medium.

The thermoacoustic device 10, of the embodiment shown in FIG. 1, has a wide frequency response range and a high sound pressure level. The sound pressure level of the sound waves generated by the thermoacoustic device 10 can be greater than 50 dB. The frequency response range of the thermoacoustic device 10 can be from about 1 Hz to about 100 KHz with a power input of 4.5 W. The total harmonic distortion of the thermoacoustic device 10 is extremely small, e.g., less than 3% in a range from about 500 Hz to 40 KHz.

The thermoacoustic device 10 can be used directly. The conductive wires 124 in the electrode layer 12 can be used as electrodes of the thermoacoustic device 10. The conductive wires 124 alternatively disposed in the electrode layer 12 can electrically connect with an anode of a power source, and the other conductive wires 124 alternatively disposed in the electrode layer 12 can electrically connect with a cathode of the power source. As such, the square resistance of the sound wave generator 14 is reduced. The thermoacoustic device 10 can also be cut into a plurality of thermoacoustic devices with smaller areas, so long as each of the thermoacoustic device 10 includes at least two conductive wires.

Figure 3:
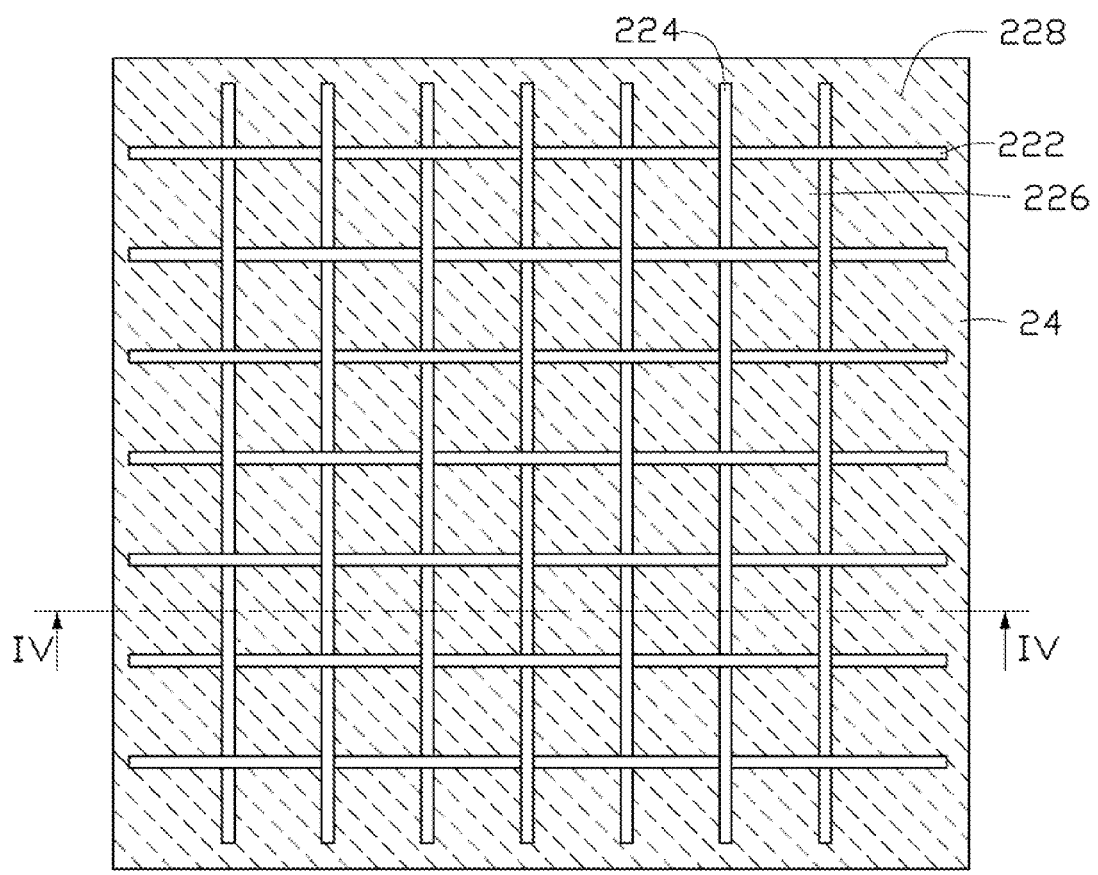
FIG. 3 is a schematic top plan view of one embodiment of a thermoacoustic device.
Figure 4:
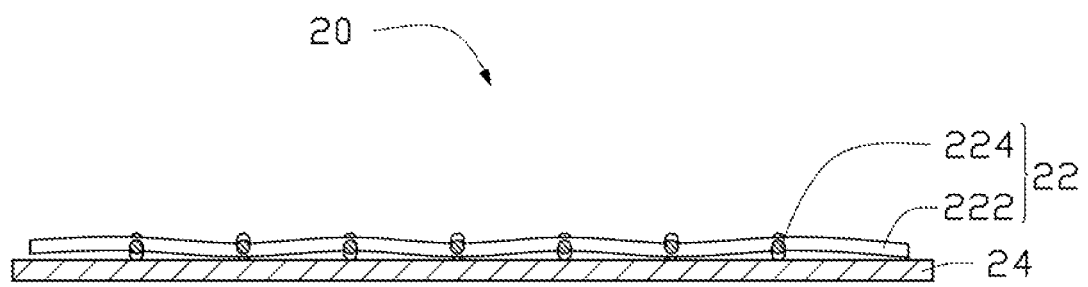
FIG. 4 is a cross-sectional view taken along a line IV-IV of the thermoacoustic device in FIG. 3.

Referring to FIGS. 3 and 4, another embodiment of a thermoacoustic device 20 includes an electrode layer 22 and a sound wave generator 24. The sound wave generator 24 is disposed on a surface of the electrode layer 22. The electrode layer 22 includes a plurality of insulated wires 222 and a plurality of conductive wires 224. The plurality of insulated wires 222 and the plurality of conductive wires 224 are weaved together to form a net structure, and the electrode layer 22 is an intertexture. On any one of the insulated wires 222, two adjacent conductive wires 224 are disposed on two opposite sides of the insulated wire 222. On any one of the conductive wires 224, two adjacent insulated wires 222 are disposed on two opposite sides of the conductive wire 224. The sound wave generator 24 includes a carbon nanotube structure. The carbon nanotube structure includes a plurality of carbon nanotubes 228 oriented in a same direction. The dashed lines show the oriented direction of the plurality of carbon nanotubes 228. An angle between the direction of the carbon nanotubes 228 and the axis of the conductive wires 224 is about 45 degrees. As such, the carbon nanotube structure has a better electrical connection with the conductive wires 224.

The other characteristics of the thermoacoustic device 20 are similar to the thermoacoustic device 10 disclosed above.

Figure 5:
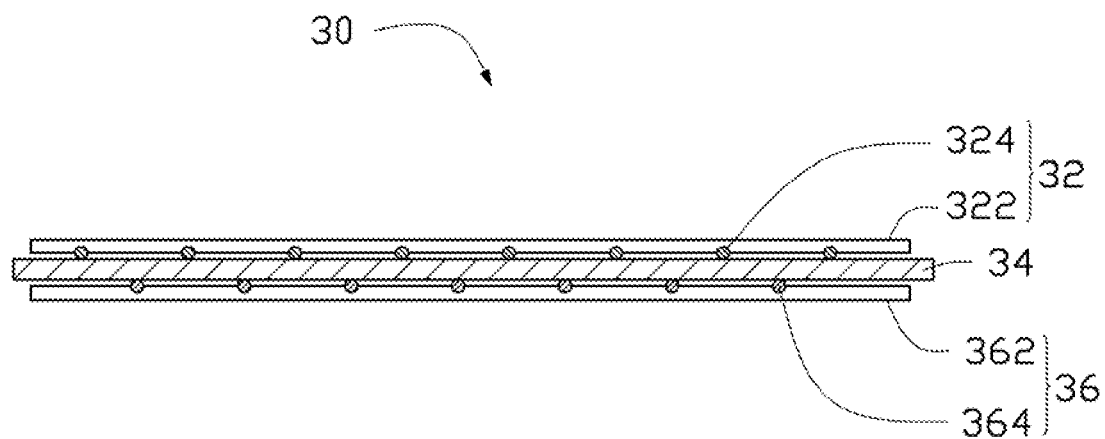
FIG. 5 is a schematic side view of one embodiment of a thermoacoustic device.

Referring to FIG. 5, yet another embodiment of a thermoacoustic device 30 includes a first electrode layer 32, a sound wave generator 34 and a second electrode layer 36. The first electrode layer 32 includes a plurality of first insulated wires 322 and a plurality of first conductive wires 324. The second electrode layer 36 includes a plurality of second insulated wires 362 and a plurality of second conductive wires 364. The sound wave generator 34 is disposed between the first electrode layer 32 and the second electrode layer 36. Each of the first conductive wires 324 and each of the second insulated wires 362 can be disposed separately on the opposite side of the sound wave generator 34. The projection of each first conductive wire 324 on the second electrode layer 36 is between two adjacent second electrode wires 364. The projection of each second conductive wire 364 on the first electrode layer 32 is between two adjacent second electrode wires 324. In use of the thermoacoustic device 30, the fist electrode wires 324 and the second electrode wires 364 can both be used as electrodes of the thermoacoustic device 30. The first electrode layer 32 and the second electrode layer 34 can fix the sound wave generator 34. As such, the sound wave generator 34 will have a good electrical connection with the first conductive wires 324 and the second conductive wires 364.

The other characteristics of the thermoacoustic device 30 are similar to the thermoacoustic device 10 disclosed above.

Figure 6:
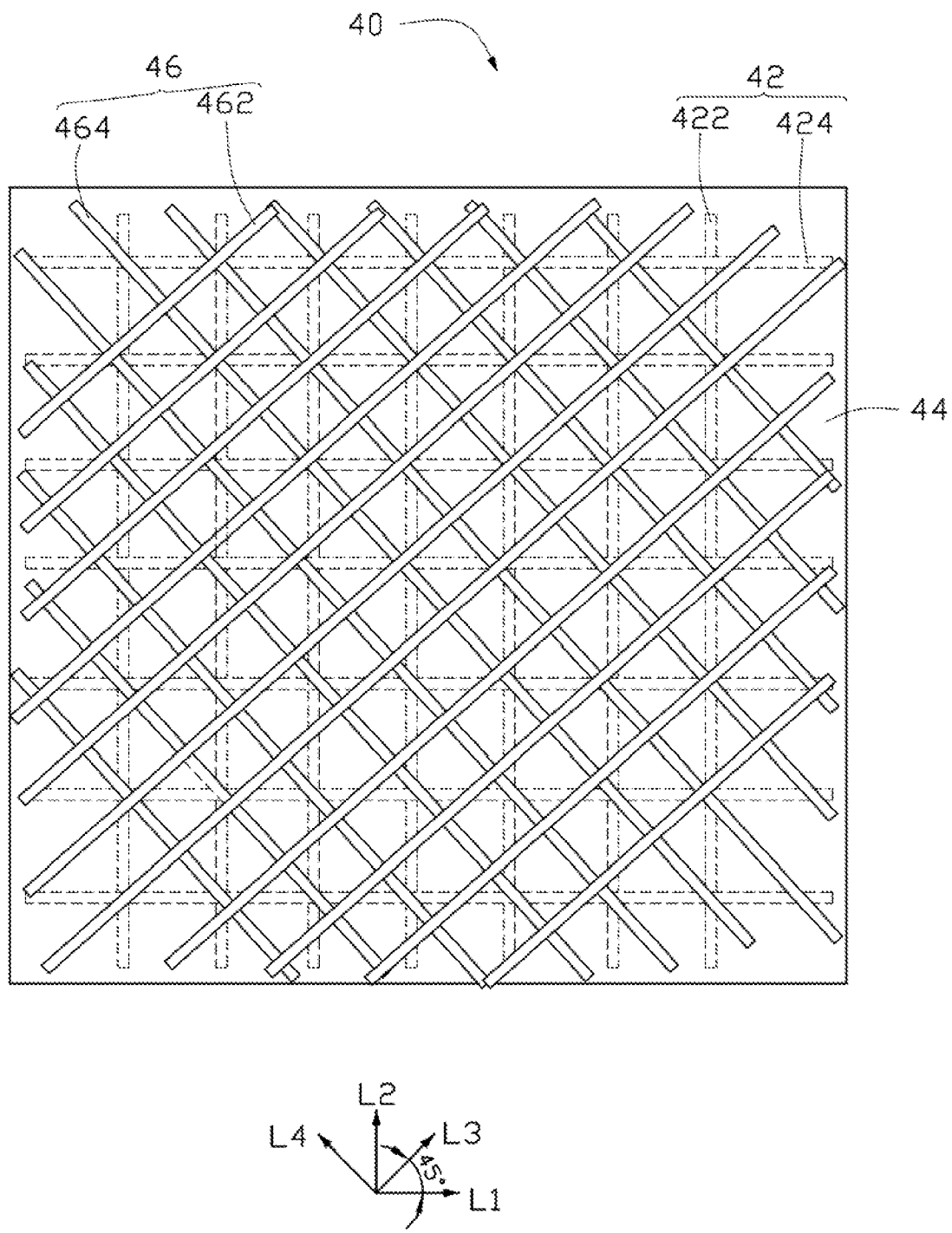
FIG. 6 is a schematic clairvoyant view of another embodiment of a thermoacoustic device.

Referring to FIG. 6, another embodiment of a thermoacoustic device 40 includes an electrode layer 42 and a sound wave generator 44. The sound wave generator 44 is disposed on a surface of the electrode layer 42. The electrode layer 42 includes a plurality of insulated wires 422 and a plurality of conductive wires 424. The plurality of insulated wires 422 and the plurality of conductive wires 424 are interwoven together to form a net structure. The plurality of insulated wires 422 is oriented along a same direction L2, and the plurality of conductive wires 424 are oriented along a same direction L1. The thermoacoustic device 40 further includes a protecting layer 46 disposed on a surface of the sound wave generator 44. The sound wave generator 44 is disposed between the protecting layer 46 and the electrode layer 42. The material of the protecting layer 46 is insulated. The insulated material can be resin, plastic, paper, cloth, or rubber. The thickness of the protecting layer 46 can range from about 0.5 μm to about 1 mm. In the present embodiment, the protecting layer 46 is a nylon net including a plurality of first nylon wires 462 and a plurality of second nylon wires 464. The first nylon wires 462 and the second nylon wires 464 cross each other. The first nylon wires 462 are oriented in a same direction L3, and the second nylon wires 464 are oriented in a same direction L4. A distance between every two adjacent first nylon wires 462 or between every two adjacent second nylon wires 464 is less than 1 centimeter. The first nylon wires 462 can be disposed side by side and contact with each other. The second nylon wires 464 can be disposed side by side and contact with each other. An angle β is formed between the direction L3 and the direction L4, and $0°<\beta\leq90°$. In one embodiment, β is about 90 degrees. An angle between the direction L1 and the direction L3 is about 45 degrees.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate rather than limit the scope of the present disclosure.

What is claimed is:

1. A thermoacoustic device, comprising:
a plurality of insulated wires spaced from each other; a plurality of conductive wires spaced from each other, wherein the plurality of conductive wires are supported by the insulated wires; and
a carbon nanotube film disposed on and electrically connected with the conductive wires, wherein the carbon nanotube film generates heat and transfers the heat to a surrounding medium causing a thermoacoustic effect, the insulated wires are substantially parallel with each other and oriented along a direction L1, the conductive wires are substantially parallel with each other and oriented along a direction L2, and an angle α between the direction L1 and the direction L2 is about 90 degrees, the carbon nanotube film comprises a plurality of carbon nanotubes joined end to end and orderly aligned along a same direction, each of the conductive wires is covered by the carbon nanotube film and contacts to the carbon nanotube film, the carbon nanotubes are aligned to be perpendicular to the direction L2.

2. The thermoacoustic device of claim 1, wherein portions of the carbon nanotube film supported between two adjacent conductive wires are suspended.

3. The thermoacoustic device of claim 1, wherein the electrode layer is a net structure, and the plurality of insulated wires are disposed on the same side of the plurality of conductive wires.

4. The thermoacoustic device of claim 1, wherein the heat capacity per unit area of the carbon nanotube film is less than or equal to about $2\times10^{-4}$ J/cm$^2$*K.

5. The thermoacoustic device of claim 4, wherein the plurality of carbon nanotubes are bundled into a plurality of carbon nanotube segments, the plurality of carbon nanotube segments are joined end-to-end.

6. The thermoacoustic device of claim 1, further comprising a protecting layer disposed on a surface of the carbon nanotube film, and the sound wave generator is disposed between the electrode layer and the protecting layer.

7. The thermoacoustic device of claim 6, wherein the protecting layer is a nylon net comprising a plurality of first nylon wires and a plurality of second nylon wires.

8. The thermoacoustic device of claim 7, wherein the plurality of first nylon wires is oriented along a same direction L3, and the plurality of second nylon net is oriented along a same direction L4; an angle β is formed between the direction L3 and the direction L4, wherein $0°<\beta\leq90°$.

9. A thermoacoustic device, comprising:
an electrode layer comprising a plurality of insulated wires and a plurality of conductive wires disposed apart from each other and crossed with the insulated wires;
a sound wave generator disposed on a surface of the electrode layer and electrically connected with the conductive wires, the sound wave generator comprising a carbon nanotube film comprising a plurality of carbon nanotubes arranged in a substantially same direction, wherein the sound wave generator generates heat and transfers the heat to a surrounding medium causing a thermoacoustic effect, wherein the conductive wires are substantially parallel with each other, each of the conductive wires is covered by the carbon nanotube film and contacts to the carbon nanotube film, and the carbon nanotubes are aligned along a direction substantially perpendicular to the conductive wires.

* * * * *